Sept. 28, 1943.  W. S. BACHMAN  2,330,328
APPARATUS FOR DISPENSING HYPOCHLORITES
Filed March 5, 1942
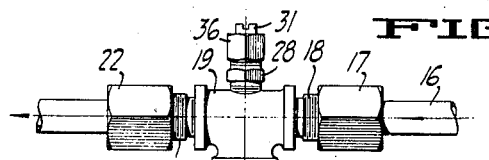
FIG_1_
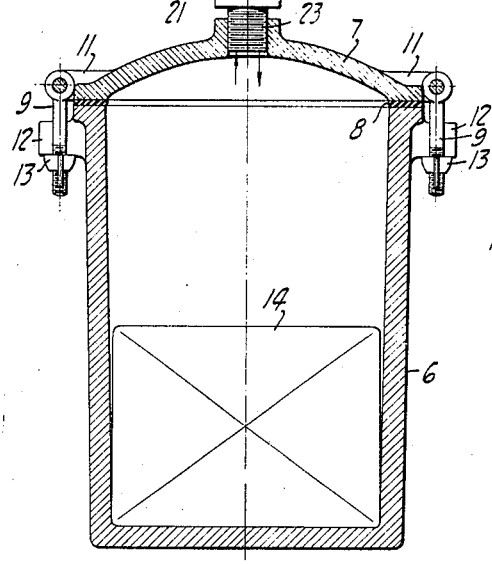
FIG_2_
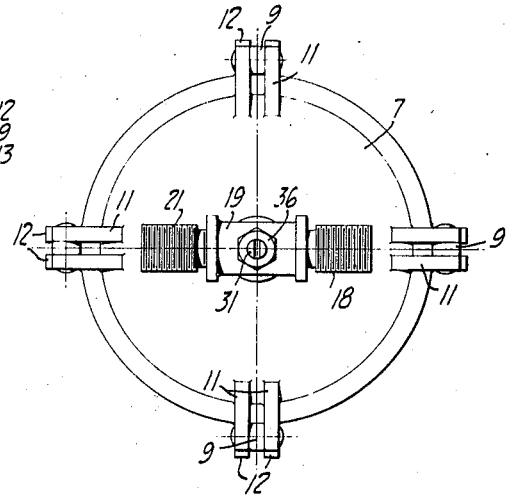
FIG_3_
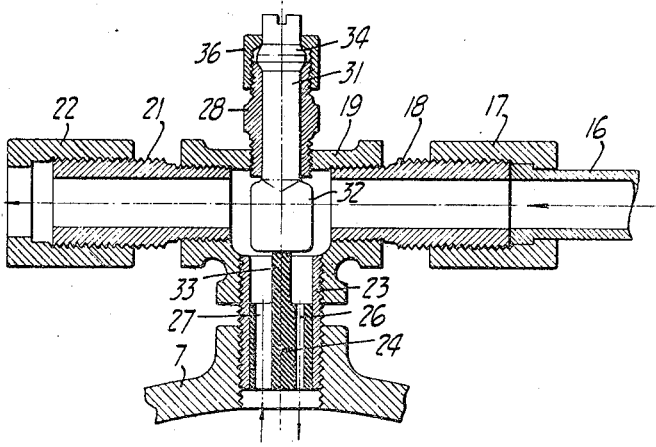
FIG_4_
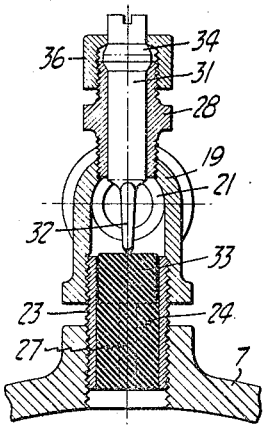
INVENTOR
Walter S. Bachman
BY Robert H. Eckhoff
ATTORNEY Patented Sept. 28, 1943

2,330,328

UNITED STATES PATENT OFFICE 2,330,328

APPARATUS FOR DISPENSING HYPOCHLORITES

Walter S. Bachman, Los Angeles, Calif.

Application March 5, 1942, Serial No. 433,507

5 Claims. (Cl. 210—36)

This invention relates to an apparatus for dispensing hypochlorites. More particularly it relates to an apparatus for applying to water a hypochlorite derived from the pellet described in my Patent 2,023,419 of December 10, 1935. It will be recalled that in that patent I disclosed a pellet composed of calcium hypochlorite particles bonded together with a cemented material to provide a substantially stable product.

In my Patent 2,233,467 of March 4, 1941, I disclosed an apparatus for utilizing such calcium hypochlorite pellet and applying this to water purification and sterilization. In the commercial application of the pellets and in the application of calcium hypochlorite generally to water, it was found that solid particles were frequently liberated which would clog valves, orifices, or other flow-regulating devices. Since the chlorine need only be applied to the water stream in relatively small dosages, these unknown restrictions would vary the dosage undesirably. The feeder device of the present invention is free of the foregoing defects in that the passages utilized for communication with the hypochlorite are either so large that plugging cannot occur or else the fluid velocity therethrough is so high that they are constantly swept clean immediately upon flow.

The hypochlorite dosage must, of necessity, be varied over a relatively wide range depending upon the use to which the water is subsequently put after treatment. The present feeder provides a simple, rugged, and yet effective means for varying the water flow relative to the quantity of hypochlorite dispensed.

It is in general the broad object of this invention to provide an improved apparatus for supplying hypochlorite to water, particularly where the demand for water is an intermittent one.

Another object of the present invention is to provide a simple, inexpensive and rugged hypochlorite feeder.

The invention includes other objects and features of advantage, some of which, together with the foregoing, will appear hereinafter wherein the present preferred form of apparatus for dispensing hypochlorites is disclosed.

In the drawing accompanying and forming a part hereof, Figure 1 is a side elevation, partly in section, through an apparatus embodying the present invention.

Figure 2 is a plan view of the apparatus shown in Figure 1.

Figure 3 is a side elevation, partly in section, through the fluid adjusting and hypochlorite feed means, while Figure 4 is an end elevation, partly in section, of the apparatus shown in Figure 3.

As appears in Figure 1 I provide a pot-like vessel 6 having a removable cover 7 thereon. A suitable gasket 8 is placed between the cover and the pot which are drawn together in use by bolts 9. These depend from and are hinged in lugs 11 on the cover and hang between pairs of ears 12 formed on the pot. Wing nuts 13 enable the cover and pot to be made up snugly. A hypochlorite pellet or other suitable source of hypochlorite, as indicated at 14, is placed in the pot.

Water is usually supplied from an inlet pipe 16 usually under the control of a valve or faucet on the upstream side thereof although the valve may be in an outlet pipe. In the form of apparatus shown in the drawing, the pipe 16 is drawn by a nut 17 against a threaded nipple 18, the threaded fitting being screwed into a T fitting 19. On the opposite side of the T, threaded nipple 21 and nut 22 typify a suitable outlet.

Into the base of the T is screwed a short nipple 23. A plug 24 made of a suitable material fits snugly in the nipple 23. Two passages are provided in the plug 24, the first passage 26 being relatively small in size as compared to passage 27. Passage 26 is provided on the upstream side of the water conduit so that water diverted into it passes through it at a relatively high rate. This insures that the inlet passage and incoming stream of water is admitted into the vessel 6 at a relatively high velocity so that passage 26 is swept clean. As a consequence, water being forcefully admitted into the water-filled vessel 6, an equal amount of liquid therein must be ejected. Consequently the larger passage 27 is forcefully swept clean of any particles even though the tendency is for this passage to become clogged. An upwardly extending wall 33 separates the passages.

To vary the rate of flow of water through the pot 6 as well as to vary the chlorine dosage, I preferably tap the T fitting 19 to receive nipple 28. In effect, this makes the T into a four-armed cross; functionally this is what the tapped T provides. In this nipple I insert a hard rubber rod 31 carrying a flat vane thereon 32. This vane fits snugly against the wall 33 on the plug 24 which extends upwardly, above the passages 26 and 27 to adjacent the vane 32. A collar 34 is suitably fixed to the rod 31 and, together with the screw cap 36, enables locking of the vane in a desired adjusted position across the inlet and outlet passages. By varying the position of the vane the hypochlorite dosage is readily adjusted.

From the foregoing it will be apparent that I have provided a relatively simple and rugged yet very effective hypochlorite feeder enabling the dosage of the hypochlorite to be varied as desired and yet maintained in a simple and efficient manner.

I claim:

1. In a device of the character described, a four armed cross member having two opposite arms therein providing a fluid inlet and an outlet, a vane supported from the third arm between said inlet and outlet arms and rotatable therein to vary the flow directly through said cross, and a plug mounted in the fourth arm and having a first passage longitudinally therein adjacent said inlet and a second passage longitudinally therein and adjacent said outlet, said first passage being of a materially smaller diameter than the second passage.

2. In a device of the character described, a four armed cross member having two opposite arms therein providing a fluid inlet and an outlet, a vane supported from the third arm between said inlet and outlet arms and rotatable therein to vary the flow directly through said cross, and a plug mounted in the fourth arm and having a first passage longitudinally therein adjacent said inlet and a second passage longitudinally therein and adjacent said outlet.

3. A chemical feeder for attachment to a water line comprising a normally closed vessel having an opening therein, a plug in said opening having an inlet passage and an outlet passage, the inlet passage being relatively small in diameter as compared to said outlet passage, a water conduit, said passages opening into said water conduit, the inlet passage being on the upstream side of said conduit and spaced from said outlet passage, and a vane extending into said conduit immediately over said plug and between said passages and rotatable therein to vary water flow through said passages.

4. A chemical feeder for attachment to a water line comprising a normally closed vessel having an opening therein, a plug in said opening having an inlet passage and an outlet passage, a water conduit, said passages opening into said water conduit, the inlet passage being on the upstream side of said conduit and spaced from said outlet passage, and a vane extending into said conduit immediately over said plug and between said passages and rotatable therein to vary water flow through said passages.

5. In a device of the character described, a four armed cross member having two opposite arms therein providing a fluid inlet and an outlet, a vane supported from the third arm between said inlet and outlet arms and rotatable therein to vary the flow directly through said cross, a closed vessel for a chemical material to be fed, said vessel having an opening therein, and a plug having one end mounted in the fourth arm and the other end in said vessel, said plug having a first passage longitudinally therein adjacent said inlet and extending into said vessel and a second passage longitudinally therein and adjacent said outlet and extending into said vessel, said vane serving to vary fluid flow from said conduit into, through and out of said vessel.

WALTER S. BACHMAN.